United States Patent
Fried (10) Patent No.: US 9,226,369 B2
(45) Date of Patent: Dec. 29, 2015

(54) COORDINATED WEARABLE LIGHTING SYSTEM

(71) Applicant: Adafruit Industries, New York, NY (US)

(72) Inventor: Limor Fried, New York, NY (US)

(73) Assignee: ADAFRUIT INDUSTRIES, New York, NY (US)

( * ) Notice: Subject to any disclaimer, the term of this patent is extended or adjusted under 35 U.S.C. 154(b) by 92 days.

(21) Appl. No.: 14/078,370

(22) Filed: Nov. 12, 2013

(65) Prior Publication Data

US 2014/0132154 A1 May 15, 2014

Related U.S. Application Data

(60) Provisional application No. 61/725,100, filed on Nov. 12, 2012.

(51) Int. Cl.
| | |
|---|---|
| *F21V 23/00* | (2015.01) |
| *F21V 21/14* | (2006.01) |
| *F21V 21/002* | (2006.01) |
| *H05B 37/02* | (2006.01) |
| *A41D 27/08* | (2006.01) |

(52) U.S. Cl.
CPC .......... *H05B 37/0254* (2013.01); *A41D 27/085* (2013.01)

(58) Field of Classification Search
CPC  H05B 37/02; H05B 37/0236; F21V 23/0008; F21V 23/005; F21V 23/0435; F21V 33/008; F21Y 2101/02; F21Y 2105/001
USPC .............. 315/297, 76; 362/249.06, 382, 294, 362/800, 249, 103, 252, 806; 345/211, 102, 345/46
See application file for complete search history.

(56) References Cited

U.S. PATENT DOCUMENTS

| | | | | |
|---|---|---|---|---|
| 5,455,749 | A * | 10/1995 | Ferber ........................... | 362/103 |
| 6,177,949 | B1 * | 1/2001 | Tokairin et al. ............... | 347/237 |
| 6,803,732 | B2 * | 10/2004 | Kraus et al. ................... | 315/307 |
| 7,265,496 | B2 * | 9/2007 | Allen ........................ | 315/185 R |
| 2001/0048459 | A1 * | 12/2001 | Sakai et al. ................... | 347/233 |
| 2007/0096132 | A1 * | 5/2007 | Wu ................................ | 257/99 |
| 2007/0297172 | A1 * | 12/2007 | Furukawa et al. ............. | 362/231 |
| 2008/0084169 | A1 * | 4/2008 | Wendt et al. .................. | 315/297 |
| 2008/0122376 | A1 * | 5/2008 | Lys ................................ | 315/192 |
| 2008/0180414 | A1 * | 7/2008 | Fung et al. .................... | 345/204 |
| 2009/0230885 | A1 * | 9/2009 | Tanaka .......................... | 315/297 |
| 2009/0251077 | A1 * | 10/2009 | Wilborn et al. ............... | 315/313 |
| 2010/0201267 | A1 * | 8/2010 | Bourquin et al. ............... | 315/32 |
| 2011/0102304 | A1 * | 5/2011 | Nelson ............................ | 345/46 |
| 2011/0119812 | A1 * | 5/2011 | Genz et al. ........................ | 2/244 |
| 2011/0133655 | A1 * | 6/2011 | Recker et al. ................. | 315/159 |

(Continued)

*Primary Examiner* — Jimmy Vu
*Assistant Examiner* — Wei Chan
(74) *Attorney, Agent, or Firm* — Leason Ellis LLP (57) ABSTRACT

A coordinated lighting system capable of affixation to a wearable garment is provided. According to more particular aspects of the invention, the system includes: a controller and a plurality of light emitting diodes (LEDs) arranged as a chain, at least one of the plurality of LEDs operatively connected to the controller. The controller is configured to: determine at least one of (a) a quantity of the plurality of LEDs and (b) an arrangement of the plurality of LEDs; and generate one or more lighting instructions based on the at least one of (a) the quantity of the plurality of LEDs and (b) the arrangement of the plurality of LEDs. A method for providing a coordinated lighting system is also provided.

19 Claims, 5 Drawing Sheets

Chained LED Pixels (56) References Cited

U.S. PATENT DOCUMENTS

| | | | |
|---|---|---|---|
| 2011/0210677 A1* | 9/2011 | Hering et al. | 315/185 R |
| 2011/0210912 A1* | 9/2011 | Jenkins et al. | 345/102 |
| 2011/0227489 A1* | 9/2011 | Huynh | 315/185 R |
| 2011/0273107 A1* | 11/2011 | Hsia et al. | 315/250 |
| 2012/0050697 A1* | 3/2012 | Suzuki | 353/85 |
| 2012/0299480 A1* | 11/2012 | Peting et al. | 315/113 |
| 2012/0306379 A1* | 12/2012 | Frost et al. | 315/151 |
| 2012/0306836 A1* | 12/2012 | Ackerman | 345/211 |
| 2013/0009553 A1* | 1/2013 | Lee | 315/153 |
| 2013/0019372 A1* | 1/2013 | Esses | 2/69 |

* cited by examiner

Fig. 1 – Prior Art        Matrixed LEDs

Fig. 2 – Prior Art        Bussed LEDs

Flex Circuit

Fig. 5

'Snap' wiring for LED

COORDINATED WEARABLE LIGHTING SYSTEM

CROSS REFERENCE TO RELATED APPLICATIONS

This application claims the benefit of U.S. provisional application Ser. No. 61/725,100, filed Nov. 12, 2012, which is hereby incorporated by reference in its entirety.

BACKGROUND OF THE INVENTION

Existing sewable light emitting diodes (LEDs), i.e., LEDs that can be sewn or otherwise affixed to fabric/garments, generally use either basic raw diode LEDs that must be hand-matrixed, or use 'smart' LEDs that have a chip on them but share a single bus.

Figure 1:
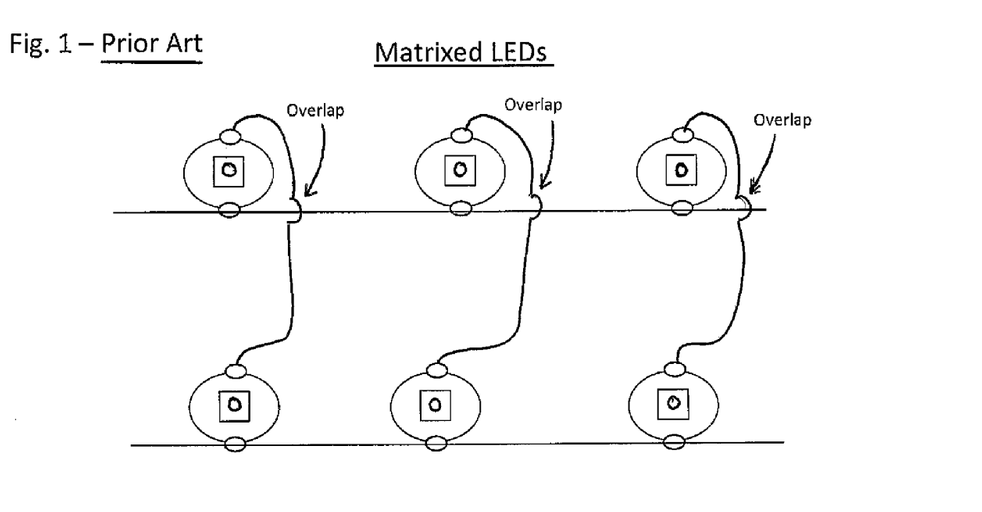
FIG. 1 is a PRIOR ART diagram illustrating a set of matrixed LEDs as generally known in the relevant Arts.

Raw LEDs are often a single color only (not full RGB spectrum) and in order to connect and control any reasonable number of LEDs, they must be multiplexed. For example, commonly there are 8×8 grids of 64 LEDs that can be controlled with a 16 pin controller (rather than 64 pins). Furthermore, when integrating such a circuit design into a fabric, conductive thread is often used for wiring the LEDs and the controller. However, the problem is that the LEDs and the threading or traces that connect them cannot be 'planar' (FIG. 1), and thus it is nearly impossible to make the LEDs and conductive thread all lay on a single fabric without overlapping problems. Also, the LEDs must be hand stitched one at a time, and it can be difficult to add more LEDs to the circuit.

Figure 2:
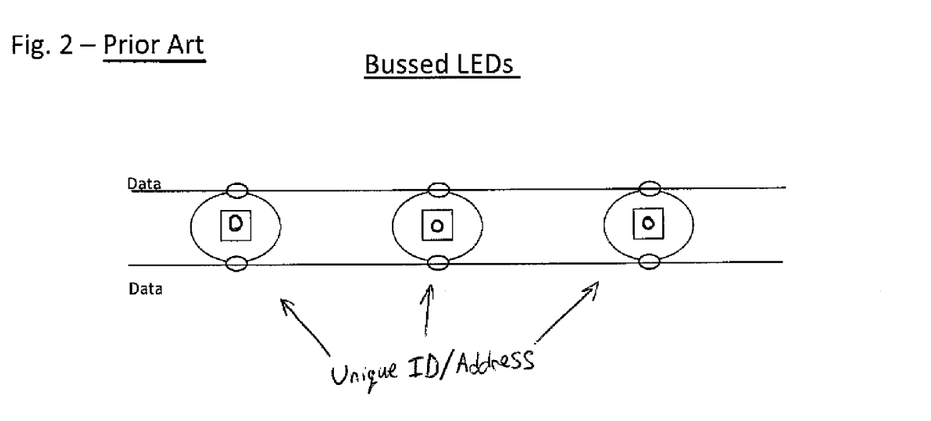
FIG. 2 is a PRIOR ART diagram illustrating a set of bussed LEDs as generally known in the relevant Arts.

Smart LEDs have also been implemented using a shared bus. In doing so, each LED pixel must have a unique identifier/address, which makes repair for large-scale clothing in the field (where a replacement LED cannot be easily assigned the unique identifier of a broken LED) essentially impossible (FIG. 2).

It is with respect to these and other considerations that the disclosure made herein is presented.

SUMMARY OF THE INVENTION

According to a broad aspect of the invention, a coordinated lighting system capable of affixation to a wearable garment is disclosed. According to more particular aspects of the invention, the system includes: a controller and a plurality of light emitting diodes (LEDs) arranged as a chain, at least one of the plurality of LEDs operatively connected to the controller. The controller is configured to: determine at least one of (a) a quantity of the plurality of LEDs and (b) an arrangement of the plurality of LEDs; and generate one or more lighting instructions based on the at least one of (a) the quantity of the plurality of LEDs and (b) the arrangement of the plurality of LEDs.

The controller can be further configured to receive one or more input signals, wherein the one or more lighting instructions are generated based on the one or more input signals. Furthermore, the one or more input signals can comprise at least one of an audio input signal, a GPS signal, a luminescence sensor signal, and a motion sensor signal. Additionally, the controller can be further configured to determine the at least one of (a) the quantity of the plurality of LEDs and (b) the arrangement of the plurality of LEDs using a shift register.

In accordance with further aspects of the invention, the system can include at least one of the plurality of LEDs is oriented on a flexible circuit. Additionally, the chain can comprise a modular chain capable of connection with one or more further LEDs. Furthermore, the controller can be further configured to generate the one or more lighting instructions in relation to the chain in the event of the connection with one or more further LEDs without requiring further configuration.

In accordance with yet other aspects of the system, the chain can comprise a modular chain capable of disconnection from one of the plurality of LEDs, and the controller can be further configured to generate the one or more lighting instructions in relation to the chain in the event of the disconnection from one of the plurality of LEDs without requiring further configuration.

In accordance with still further aspects, the at least one of the plurality of LEDs can be operatively connected to the controller comprises a first LED, and one or more remaining LEDs from among the plurality of LEDs that are not the first LED can be operatively connected to at least one of (a) the first LED and (b) at least one of the one or more remaining LEDs. Furthermore, the one or more lighting instructions can comprise a lighting presentation coordinated for depiction across the plurality of LEDs.

In a variation of one or more of the foregoing aspects, in a broad aspect of the invention, a method of providing a coordinated lighting system capable of affixation to a wearable garment is provided. According to more particular aspects of the invention, the method can comprise: arranging a plurality of light emitting diodes (LEDs) as a chain; operatively connecting at least one of the plurality of LEDs to a controller; determining by the controller at least one of (a) a quantity of the plurality of LEDs and (b) an arrangement of the plurality of LEDs; and generating by the controller one or more lighting instructions based on the at least one of (a) a quantity of the plurality of LEDs and (b) an arrangement of the plurality of LEDs. These and other aspects, features, and advantages can be appreciated from the accompanying description of certain embodiments of the invention and the accompanying drawing figures and claims.

DETAILED DESCRIPTION OF CERTAIN EMBODIMENTS OF THE INVENTION

Described herein, in certain implementations, is a coordinated lighting system and a method for providing a coordinated lighting system.

In certain implementations, LED pixels can be linked together, and the set of LEDs can then be configured with a 'shift register' approach to managing data. Shift registers are integrated circuits which use logic gates to control many inputs or outputs at once. Instead of individual and dedicated addressing, data is pushed down pixel by pixel. When the data is complete, a signal can be sent down to 'latch' the data, i.e., to set the output sequence in the register of the controller. A controller chip can include built-in pulse-width modulation (PWM) control so it can handle the heavy lifting of driving an LED at 24 bit color. Accordingly, additional lengths of LEDs can be added onto the end and the accompanying software can easily address the additional pixels. The pixels themselves are not addressed, so if a pixel dies, a new one can be easily spliced in to take its place.

Figure 3:
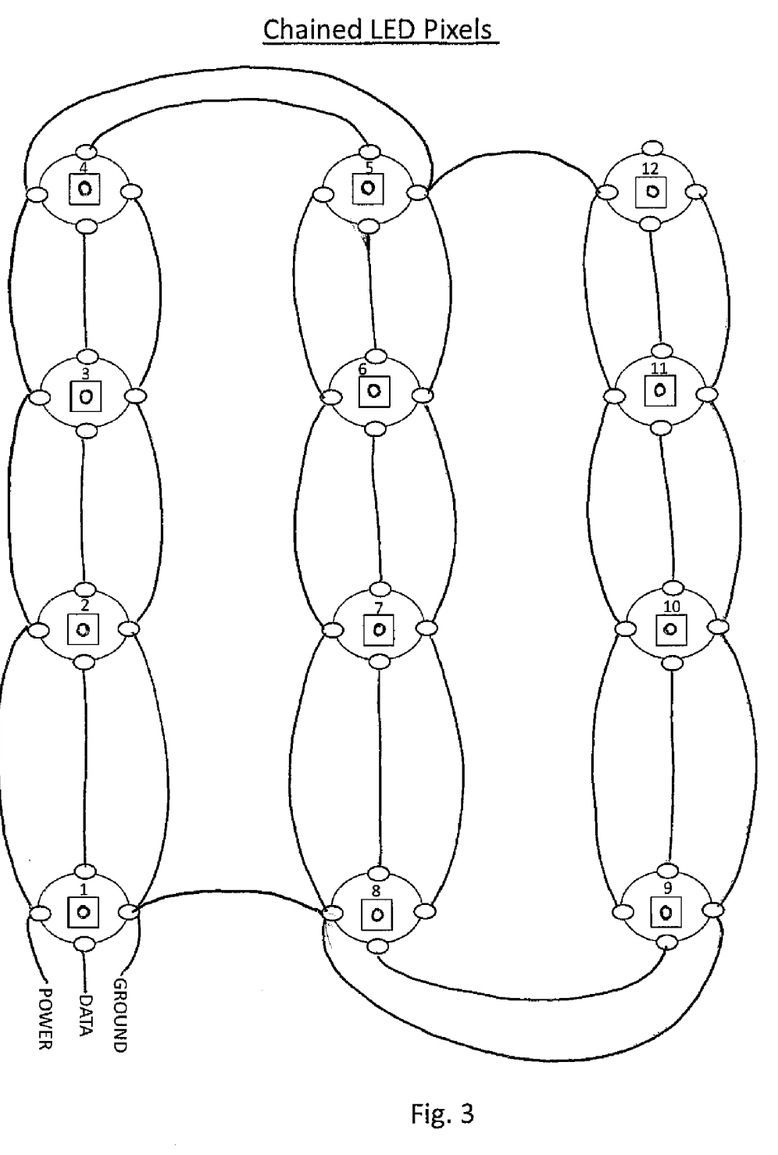
FIG. 3 is a high-level diagram illustrating an exemplary configuration of a portion of a coordinated lighting system circuit according to at least one embodiment of the invention.
Figure 4:
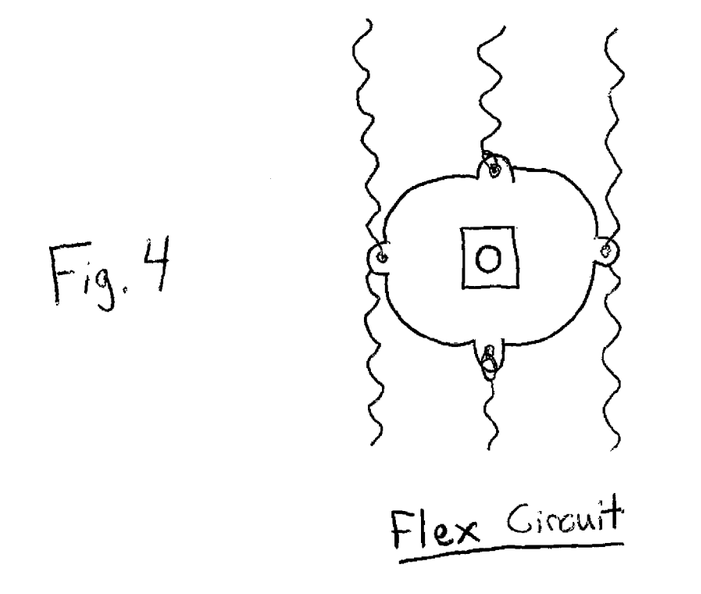
FIG. 4 is an illustration of an LED configured on a Flex Circuit according to at least one aspect of the invention.
Figure 5:
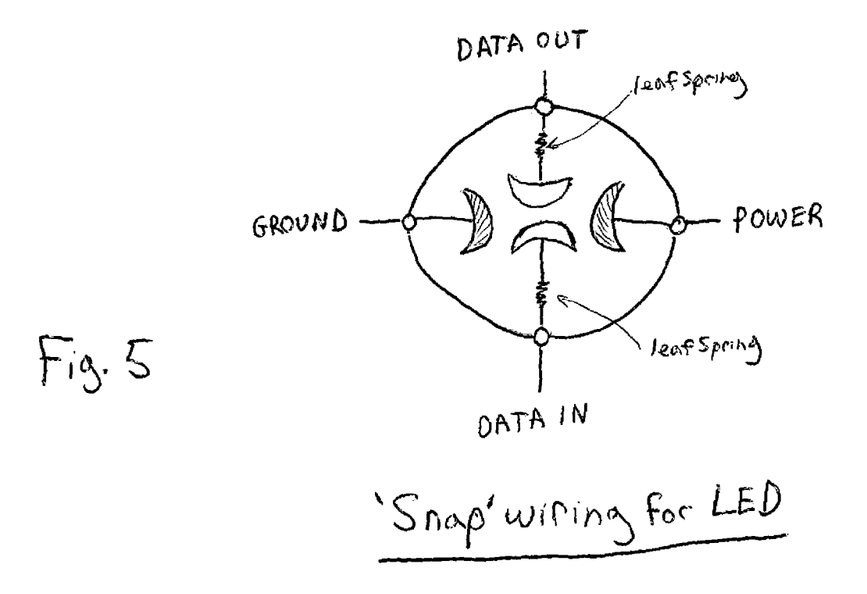
FIG. 5 is an illustration of a metal snap for affixing an LED in a circuit according to at least one aspect of the invention.

For example, the lighting system can be implemented, in part, using a chip (or other such micro-controller) that uses a single input wire, and a single output wire with Manchester-like encoding. The single input/output makes assembly of wearable pixels as easy as possible without having to deal with the difficulties associated with addressable pixels. In some embodiments, an input wire of a first LED is connected to an output pin of a controller, and the output wire of the first LED is then connected to the input of a second LED, etc. Having the data inputs/outputs of the LEDs linked or 'chained' in this manner removes the 'planar problem' (FIG. 3) because no wires have to cross and all LEDs can be easily controlled. Furthermore, in some embodiments, while the data inputs/outputs of the LEDs are daisy-chained connecting the output of one LED to the input of the next, the power and/or ground inputs of each LED can be connected in any combination of parallel and/or series connections, since the data connections will determine when the LEDs are illuminated and when they are not. As such, it becomes very easy to incorporate such a system into unique circuit design implementations using, for example, machine sewable pixels mounted on a flex (flexible) circuit (FIG. 4), or sewn metal spring-snaps (like those used on jackets and bags) to snap-in LEDs that can be removed or reconfigured (FIG. 5).

The entire wearable electronics system can be controlled using a programmable controller chip and platform, such as the Adafruit FLORA™ platform, and can be programmed to display a variety of light patterns and designs, for example, on RGB (red, green, blue) LEDs that are paired with the controller. Various LED instructions/light patterns can be generated/provided to the LEDs in any number of ways. For example, instructions/patterns can be generated based on an image, audio, video, or any other data source, such as a digital signal input of any kind. In some embodiments, one or more sensors can provide a digital signal input to the controller, which can generate instructions/light patterns based on the signal input, in addition to or in place of the above data sources. For example, a Global Positioning System (GPS) can provide coordinate data, a luminescence sensor signal can provide a light measurement, and/or a motion sensor (e.g., accelerometer and compass) can provide a motion sensor data, any/all of which can be used in determining the instructions/light patterns that can be generated/provided to the LEDs. In some embodiments, the audio signal received by the controller can be first detected by a microphone and converted to a digital signal.

In certain implementations, a 'dongle' connected to a computing device (using, e.g., USB) can be used to program the system with standard "DMX" software for lighting, as is sometimes employed among costume/set designers in other disciplines. In other implementations, Bluetooth, Wi-Fi, or any other form of radio frequency (RF) signal can be similarly implemented to provide data to the LED controller. For example, a Bluetooth module can be sewn into clothing such as a jacket and powered with the same battery or other power source as the LEDs. Then a connection to the system can be made via a mobile electronic device such as a smart cell phone running an appropriate system programming application. The user can simply set the "preferences" in the application on the device, for example, by selecting preference buttons or by drawing the desired pixel pattern on the device screen once to program the system and set up the display. Then, using, for example, the 'audio out' Bluetooth functionality to deliver the programmed data, the jacket will receive the data and automatically determine a display of the data signal, e.g., a wave or pattern based on digital music data, enabling the LED system to present patterns coordinated with an output signal such as an audio output. For instance, audio from a device (e.g., phone) can be passed to the lighting system, and the audio can be processed into the appropriate DMX instructions (which are passed on to the chain of LEDs for coordinated display).

Alternatively, the above approaches can be combined using a full DMX lighting-control system-type service on a mobile device. It should also be noted that it is possible for the system to 'auto detect' the number of pixels (and/or their arrangement) by listening to the last pixel until it sees the shifted data appear on the other side; by counting how many pixels it had to clock, the system would know the length of the strand, i.e., how many pixels are in the chain. And provided the data inputs/outputs of the LEDs have been connected in a chain as described above, the system can determine the arrangement of the pixels, e.g., based on the number of pixels calculated.

Accordingly, described herein are systems and methods for lighting coordination. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

Figure 6:
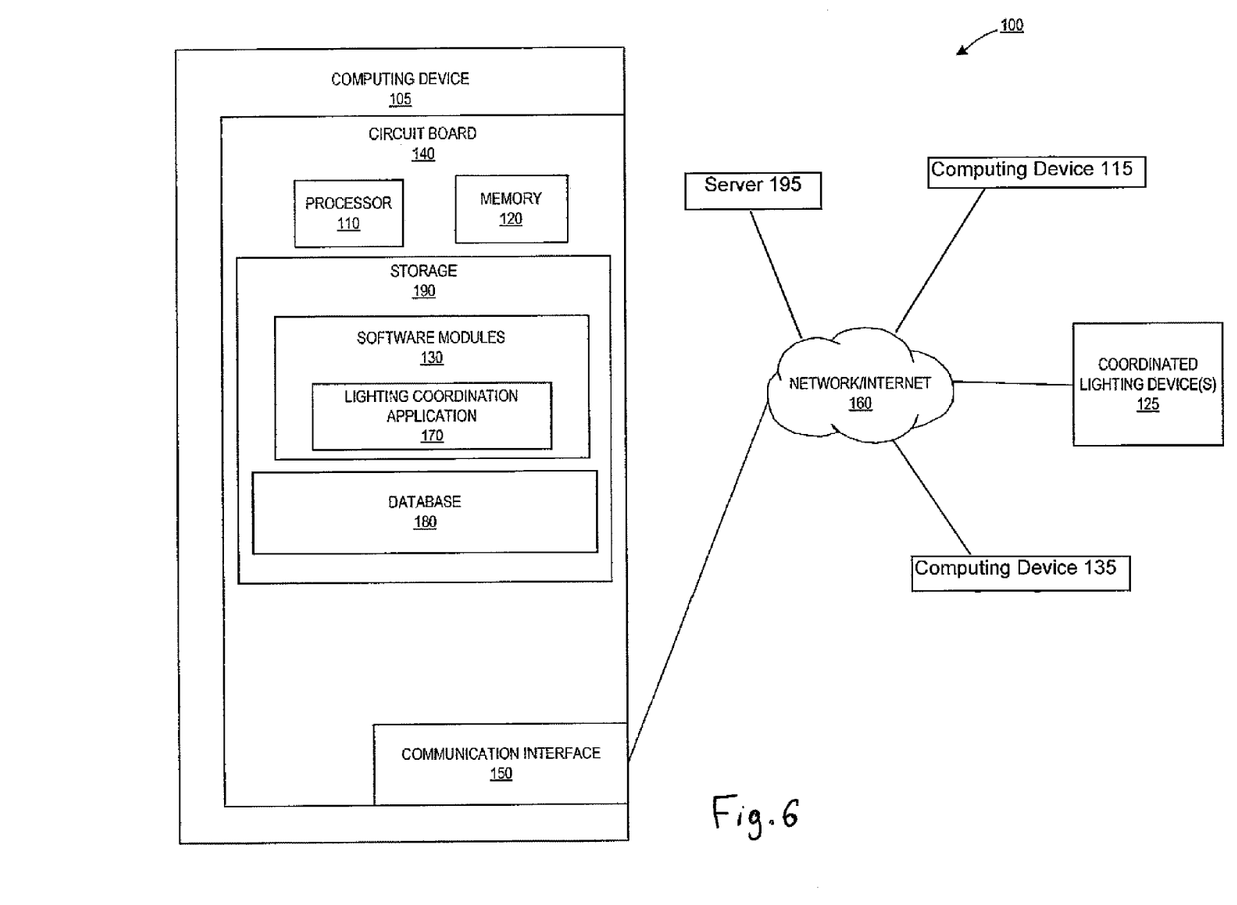
FIG. 6 is a block diagram illustrating an exemplary configuration of a coordinated lighting according to at least one embodiment of the invention.

An exemplary computer system is shown as a block diagram in FIG. 6 which is a high-level diagram illustrating an exemplary configuration of a lighting coordination system 100. In one implementation, computing device 105 can be a personal computer or server. In other implementations, computing device 105 can be a tablet computer, a laptop computer, or a mobile device/smartphone, though it should be understood that computing device 105 of lighting coordination system 100 can be practically any computing device and/or data processing apparatus/controller capable of embodying the systems and/or methods described herein.

In some embodiments, computing device 105 of lighting coordination system 100 includes a circuit board 140, such as a motherboard, which is operatively connected to various hardware and software components that serve to enable operation of the lighting coordination system 100. The circuit board 140 is operatively connected to a processor 110 and a memory 120. Processor 110 serves to execute instructions for software that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type.

Preferably, memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices such as a hard drive, a flash memory, a rewritable optical disk, a rewritable magnetic tape, or some combination of the above. Storage 190 also can be fixed or removable.

In some embodiments, one or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages, including an object oriented programming language such as Java, Smalltalk, C++, Python, and JavaScript or the like and conventional procedural programming languages, such as the "C" programming language or similar programming languages. The program code can execute entirely on computing device 105, partly on computing device 105, as a stand-alone software package, partly on computing device 105 and partly on a remote computer/device, or entirely on the remote computer/device or server. In the latter scenario, the remote computer can be connected to computing device 105 through any type of network, including a local area network (LAN) or a wide area network (WAN), or the connection can be made to an external computer (for example, through the Internet 160 using an Internet Service Provider). Furthermore, the connection can include one or more wired and/or wireless network connections that facilitate communication of the program code/software modules to the processor of the controller as explained below.

One or more software modules 130, including program code/instructions, are located in a functional form on one or more computer readable storage devices (such as memory 120 and/or storage 190) that can be selectively removable. The software modules 130 can be loaded onto or transferred to computing device 105 for execution by processor 110. It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of software modules 130 can be downloaded over a network to storage 190 from another device or system via communication interface 150 for use within lighting coordination system 100. For instance, program code stored in a computer readable storage device in a server, such as server 195, can be downloaded over a network from the server to lighting coordination system 100.

Preferably, included among the software modules 130 is a lighting coordination application 170 that is executed by processor 110. During execution of the software modules 130, and specifically the lighting coordination application 170, the processor 110 configures the circuit board 140 to perform various operations relating to lighting coordination with computing device 105, as will be described in greater detail below. It should be understood that while software modules 130 and/or lighting coordination application 170 can be embodied in any number of computer executable formats, in certain implementations software modules 130 and/or lighting coordination application 170 comprise one or more applications that are configured to be executed at computing device 105 in conjunction with one or more applications or 'apps' executing at remote devices, such as computing device(s) 105, 115, and/or 135 and/or coordinated lighting device(s) 125, and/or one or more viewers such as internet browsers and/or proprietary applications. Furthermore, in certain implementations, software modules 130 and/or lighting coordination application 170 can be configured to execute at the request or selection of a user of one of computing devices 105, 115, and/or 135, and/or coordinated lighting device(s) 125, (or any other such user having the ability to execute a program in relation to computing device 105, such as a network administrator), while in other implementations computing device 105 can be configured to automatically execute software modules 130 and/or lighting coordination application 170, without requiring an affirmative request to execute. It should also be noted that while FIG. 6 depicts memory 120 oriented on circuit board 140, in an alternate arrangement, memory 120 can be operatively connected to the circuit board 140. In addition, it should be noted that other information and/or data relevant to the operation of the present systems and methods (such as database 180) can also be stored on storage 190, as will be discussed in greater detail below.

Also preferably stored on storage 190 is database 180. As will be described in greater detail below, database 180 contains and/or maintains various data items and elements that are utilized throughout the various operations of lighting coordination system 100, as will be described in greater detail herein. It should be noted that although database 180 is depicted as being configured locally to computing device 105, in certain implementations database 180 and/or various of the data elements stored therein can be located remotely (such as on a remote device or server 195) and connected to computing device 105 through network 160, in a manner known to those of ordinary skill in the art.

As referenced above, it should be noted that in certain implementations, such as the one depicted in FIG. 6, coordinated lighting device(s) 125 can be in periodic or ongoing communication with computing device 105 through a computer network such as the Internet 160. Though not shown, it should be understood that in certain other implementations, coordinated lighting device(s) 125 can be in periodic or ongoing direct communication with computing device 105, such as through communications interface 150.

Communication interface 150 is also operatively connected to circuit board 140. Communication interface 150 can be any interface that enables communication between the computing device 105 and external devices, machines and/or elements. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 105 to other computing devices and/or communication networks such as private networks and the Internet. Such connections can include a wired connection or a wireless connection (e.g. using the 802.11 standard) though it should be understood that communication interface 150 can be practically any interface that enables communication to/from the circuit board 140.

At various points during the operation of lighting coordination system 100, computing device 105 can communicate with one or more other computing devices and/or coordinated lighting device(s) 125, such as those controlled and/or maintained by one or more individuals and/or entities. Such computing devices and/or coordinated lighting device(s) 125 transmit and/or receive data to/from computing device 105, thereby preferably initiating, maintaining, and/or enhancing the operation of the lighting coordination system 100, as will be described in greater detail below. It should be understood that the computing devices and/or coordinated lighting device(s) 125 can be in direct communication with computing device 105, indirect communication with computing device 105, and/or can be communicatively coordinated with computing device 105, as will be described in greater detail below. While such computing devices can be practically any device capable of communication with computing device 105, in certain embodiments various of the computing devices are preferably servers, while other computing devices are preferably user devices (e.g., personal computers, handheld/portable computers, smartphones, etc.), though it should be understood that practically any computing device that is capable of transmitting and/or receiving data to/from computing device 105 can be similarly substituted.

It should be noted that while FIG. 6 depicts lighting coordination system 100 with respect to coordinated lighting device(s) 125, it should be understood that any number of coordinated lighting devices can interact with the lighting coordination system 100 in the manner described herein. It should be further understood that a substantial number of the operations described herein are initiated by and/or performed in relation to such coordinated lighting devices.

In the description that follows, certain embodiments and/or arrangements are described with reference to acts and symbolic representations of operations that are performed by one or more devices, such as the lighting coordination system 100 of FIG. 6. As such, it will be understood that such acts and operations, which are at times referred to as being computer-executed or computer-implemented, include the manipulation by processor 110 of electrical signals representing data in a structured form. This manipulation transforms the data and/or maintains them at locations in the memory system of the computer (such as memory 120 and/or storage 190), which reconfigures and/or otherwise alters the operation of the system in a manner understood by those skilled in the art.

The data structures in which data are maintained are physical locations of the memory that have particular properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated for the lighting coordination system 100. Other components shown in FIG. 6 can be varied from the illustrative examples shown. The different embodiments can be implemented using any hardware device or system capable of running program code. In another illustrative example, lighting coordination system 100 can take the form of a hardware unit that has circuits that are manufactured or configured for a particular use. This type of hardware can perform operations without needing program code to be loaded into a memory from a computer readable storage device to be configured to perform the operations.

For example, computing device 105 can take the form of a circuit system, an application specific integrated circuit (ASIC), a programmable logic device, or some other suitable type of hardware configured to perform a number of operations. With a programmable logic device, the device is configured to perform the number of operations. The device can be reconfigured at a later time or can be permanently configured to perform the number of operations. Examples of programmable logic devices include, for example, a programmable logic array, programmable array logic, a field programmable logic array, a field programmable gate array, and other suitable hardware devices. With this type of implementation, software modules 130 can be omitted because the processes for the different embodiments are implemented in a hardware unit.

In still another illustrative example, computing device 105 can be implemented using a combination of processors found in computers and hardware units. Processor 110 can have a number of hardware units and a number of processors that are configured to execute software modules 130. In this example, some of the processors can be implemented in the number of hardware units, while other processors can be implemented in the number of processors.

In another example, a bus system can be implemented and can be comprised of one or more buses, such as a system bus or an input/output bus. Of course, the bus system can be implemented using any suitable type of architecture that provides for a transfer of data between different components or devices attached to the bus system. Additionally, communications interface 150 can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types.

It should be further understood that while the various computing devices and machines referenced herein, including but not limited to computing devices 105, 115, 135, and coordinated lighting device(s) 125 are referred to herein as individual/single devices and/or machines, in certain implementations the referenced devices and machines, and their associated and/or accompanying operations, features, and/or functionalities can be arranged or otherwise employed across any number of devices and/or machines, such as over a network connection, as is known to those of skill in the art.

It should also be noted that, although not all shown in FIG. 6, various additional components can be incorporated within and/or employed in conjunction with computing device 105. For example, computing device 105 can include an embedded and/or peripheral audio projection device such as a speaker and/or an embedded and/or peripheral audio capture device such as a microphone. Likewise, computing device and/or coordinated lighting device(s) 125 can be operatively connected to one or more sensors, such as a GPS, a light sensor (IR and/or visible), motion sensor, accelerometer, compass, speedometer, etc. Further connections to other data sources and sensors as known to those of skill in the art are also possible, such as heart monitors, pacemakers, thermometers, etc., which can be integrated, for example, into the clothing of a sleeping child or elderly/sickly patient, to allow visual monitoring with minimal interaction.

Figure 7:
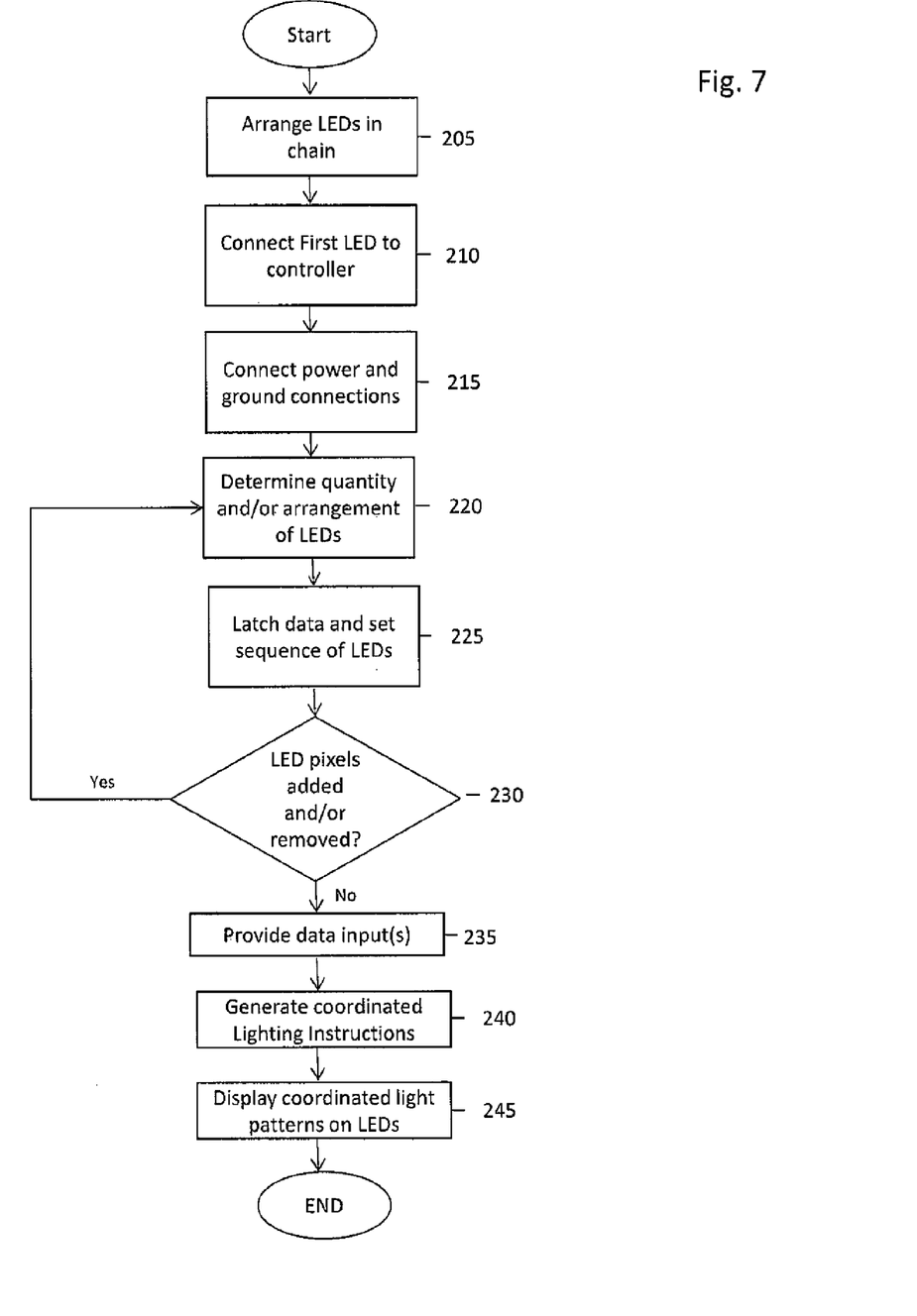
FIG. 7 is a flow diagram illustrating a process of providing a coordinated lighting system according to at least one embodiment of the invention.

The operation of the lighting coordination system 100 and the various elements and components described above will be further appreciated with reference to the method for lighting coordination as described herein in method 200 of FIG. 7. The method begins, and at step 205 a plurality of light emitting diodes (LEDs) are arranged as a chain for affixation to a wearable garment. As described above, each LED can comprise an input and an output, wherein the output of a first LED is connected to the input of a second LED, and so on. In some embodiments, connections are made using conductive wire thread that can be sewn into a wearable garment, and/or using conventional wiring where desired. As step 210, the input of the first LED is connected to a single pin (output) of the controller. As such, a single controller output can control many LED pixels.

Next, at step 215, connections are made between a power output of the controller and a power input of each LED. Likewise, a connections can be made between a ground of the controller and a ground of each LED. As explained above, in some embodiments, while the data inputs/outputs of the LEDs are daisy-chained connecting the output of one LED to the input of the next, the power and/or ground inputs of each LED can be connected in any combination of parallel and/or series connections, since the data connections will determine when the LEDs are illuminated and when they are not.

It should be noted that while in some embodiments of the method, LEDs are first connected to one another and then fastened to a garment, in other embodiments, LEDs can be first situated in desired locations on a garment and then operatively connected using, for example, the conductive thread. Likewise, connection to the controller can be performed prior to, during, or after connection of the plurality of LEDs to one another, provided the sequence of the individual parts on the chain is maintained as described above.

Next, at step 220, the quantity and/or arrangement of LED pixels is determined. As explained above, in some embodiments a shift register can be employed and a data signal is pushed down the chain, pixel by pixel. Once the controller detects the last LED in the chain, a signal can be sent down the chain to 'latch' the data, i.e., to set the output sequence in the register of the controller, at step 225. At step 230, additional LEDs can be added, subtracted, and/or replaced as necessary, and further detection and latching can be performed as required. For this reason, should a particular LED become defective, and a new one need to be inserted in its place, the system can be fixed with minimal effort, as the controller is aware of sequence and can re-determine the sequence if necessary. Likewise, should the user desire to add or remove one or more LEDs in the future, the controller can easily re-determine the sequence of the chain and latch the new sequence in the register of the controller.

At step 235, any additional desired data can be provided to the controller. For example, as described above, an audio signal can be provided for programming the LEDs to display a visual representation of the audio signal. Of course, any desired pattern can be provided directly or indirectly via database 180 and/or communication interface 150. Additionally, any one of a number of software modules 130 can interact with one or more sensors as described above to provide a predefined and/or continuously updating (live) data signal to affect the generation of the lighting instructions. For example, a GPS signal can continuously update a location based signal to direct a wearer of the wearable coordinated lighting system in particular direction by creating distinct predefined lighting patterns (e.g., arrows). As another example, a light meter can detect light provide a signal to the controller to adjust the relative brightness of the LEDs accordingly.

At step 240, the controller can generate a coordinated lighting instruction/lighting pattern based on the quantity and/or arrangement of the LED pixels, and/or the one or more data signals received in step 235. Based, on predefined and/or adjustable user settings chosen in the lighting coordination application 170, the controller can give varying levels of importance to different data signals. Furthermore, different software modules 130 can be programmed to interact with lighting coordination application 170 at different times and/or under different conditions. For example, a software module interacting with a microphone might be programmed to send an audio output signal to lighting coordination application 170 only when a certain decibel level is reached. As another example, a software module interacting with the light sensor and GPS might be programmed to send data signals to lighting coordination application 170 to illuminate the LEDs when the wearer reached a particular destination, but only during a specific timeframe.

Additionally, as described above, a data signal can include a communication received by the communication interface 150 from another computing device, such as computing devices 115 and 135, and/or from other coordinated lighting device(s) 125. Such signals can be likewise included in the generation of a coordinated lighting instruction. For example, a plurality of computing devices 105 can communicate and coordinate lighting patterns between the plurality, and/or can interact with and/or affect the lighting patterns generated by a particular computing device.

At step 245, lighting coordination application 170 instructs the LEDs to display the generated coordinated lighting instruction(s)/lighting pattern(s), and the lighting patterns are displayed on the LEDs, and the method ends. As discussed above, the lighting patterns can be updated in real time or can be predefined.

At this juncture, it should be noted that although much of the foregoing description has been directed to systems and methods for lighting coordination, the systems and methods disclosed herein can be similarly deployed and/or implemented in scenarios, situations, and settings far beyond the illustrated scenarios. It can be readily appreciated that lighting coordination system 100 can be effectively employed in practically any scenario where lighting coordination can be useful. It should be further understood that any such implementation(s) and/or deployment(s) are within the scope of the systems and methods described herein.

It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for lighting coordination. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A coordinated lighting system capable of affixation to a wearable garment, the system comprising:
    a controller, a mobile device; and a plurality of light emitting diodes (LEDs) arranged in a daisy chain arrangement, wherein each of the LEDs is selectively removable and selectively rearrangeable relative to the wearable garment, and at least one of the plurality of LEDs is operatively connected to the controller;
    wherein the mobile device is configured to output one or more audio signals;
    wherein the controller is configured to: (a) receive the one or more audio signals as an input; (b) auto-detect (i) a quantity of the plurality of LEDs and (ii) an arrangement of the plurality of LEDs; and (c) generate one or more lighting instructions based on the quantity of the plurality of LEDs and the arrangement of the plurality of LEDs;
    wherein the one or more lighting instructions are generated based on the received one or more audio signals;
    wherein the plurality of LEDs are connected to one another to form the daisy chain arrangement such that an output of one LED is connected to an input of an adjacent LED in the daisy chain arrangement to permit a signal to be sent from the controller to one LED to another LED along the daisy chain arrangement.

2. The system as in claim 1, wherein the controller is further configured to auto-detect (a) the quantity of the plurality of LEDs and (b) the arrangement of the plurality of LEDs using a shift register.

3. The system as in claim 1, wherein the plurality of LEDs is oriented on a flexible circuit.

4. The system as in claim 1, wherein the controller is further configured to generate the one or more lighting instructions in relation to the chain in the event of the physical connection with one or more further LEDs to the chain without requiring further configuration.

5. The system as in claim 1, wherein the controller is further configured to generate the one or more lighting instructions in relation to the chain in the event of the physical disconnection of one of the plurality of LEDs from the chain without requiring further configuration.

6. The system as in claim 1, wherein the at least one of the plurality of LEDs operatively connected to the controller comprises a first LED; and
    wherein one or more remaining LEDs from among the plurality of LEDs that are not the first LED are operatively connected to at least one of (a) the first LED and (b) at least one of the one or more remaining LEDs.

7. The system as in claim 1, wherein the one or more lighting instructions comprises a lighting presentation coordinated for depiction across the plurality of LEDs.

8. A method of providing a coordinated lighting system capable of affixation to a wearable garment, the method comprising:
    arranging a plurality of light emitting diodes (LEDs) as a chain, wherein each of the LEDs is selectively removable and selectively rearrangeable relative to the wearable garment;
    operatively connecting the plurality of LEDs to a controller;
    outputting one or more audio signals by a mobile device;
    receiving the one or more audio signals as an input at the controller;
    auto-detecting a quantity of the plurality of LEDs and an arrangement of the plurality of LEDs by the controller; and
    generating one or more lighting instructions by the controller based on a quantity of the plurality of LEDs and an arrangement of the plurality of LEDs;
    generating the one or more lighting instructions by the controller based on the received one or more audio signals.

9. The method as in claim 8, wherein the the quantity of the plurality of LEDs and the arrangement of the plurality of LEDs is determined auto-detected using a shift register.

10. The method as in claim 8, wherein the plurality of LEDs is oriented on a flexible circuit.

11. The method as in claim 8, further comprising generating the one or more lighting instructions in relation to the chain in the event of the physical connection with one or more further LEDs to the chain without requiring further configuration.

12. The method as in claim 8, further comprising generating the one or more lighting instructions in relation to the chain in the event of the physical disconnection of one of the plurality of LEDs from the chain without requiring further configuration.

13. The method as in claim 8, wherein the at least one of the plurality of LEDs operatively connected to the controller comprises a first LED; and
wherein one or more remaining LEDs from among the plurality of LEDs that are not the first LED are operatively connected to at least one of (a) the first LED and (b) at least one of the one or more remaining LEDs.

14. The method as in claim 8, wherein the one or more lighting instructions comprises a lighting presentation coordinated for depiction across the plurality of LEDs.

15. The method as claim 8, further comprising:
selectively changing the quantity of the plurality of LEDs and an arrangement of the plurality of LEDs; and
generating one or more additional lighting instructions by the controller based on the new quantity of the plurality of LEDs and new arrangement of the plurality of LEDs.

16. The method as in claim 9, wherein the step of auto-detecting (a) a quantity of the plurality of LEDs and (b) an arrangement of the plurality of LEDs comprises:
sending a data signal along the chain one LED to another LED to detect a last LED in the chain; and
sending another signal along the chain, once the controller detects the last LED in the chain, to set an output sequence in a register of the controller.

17. The method as in claim 16, wherein the method further includes the steps of:
listening to the LEDs in the chain which includes a first LED and the last LED, wherein the step of detecting the last LED comprises detecting shifted data at the first LED, whereby the quantity of the plurality of LEDs is determined by the shift register; and
determining the arrangement thereof based on the number of LEDs detected.

18. The system of claim 1, wherein each LED comprises a metal spring snap structure to allow one LED to be removed or reconfigured relative to the wearable garment.

19. The system of claim 18, wherein the wearable garment includes a complementary support structure to mate with the metal spring snap structure of the LED.

\* \* \* \* \*